United States Patent
Mori et al.

(10) Patent No.: US 8,285,002 B2
(45) Date of Patent: Oct. 9, 2012

(54) IMAGE PROCESSING APPARATUS AND METHOD, IMAGE SENSING APPARATUS, AND PROGRAM

(75) Inventors: Katsuhiko Mori, Kawasaki (JP); Masakazu Matsugu, Yokohama (JP); Yusuke Mitarai, Yokohama (JP); Yuji Kaneda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 11/572,884

(22) PCT Filed: Jul. 27, 2005

(86) PCT No.: PCT/JP2005/014135
§ 371 (c)(1),
(2), (4) Date: Jan. 29, 2007

(87) PCT Pub. No.: WO2006/011630
PCT Pub. Date: Feb. 2, 2006

(65) Prior Publication Data
US 2008/0123906 A1    May 29, 2008

(30) Foreign Application Priority Data
Jul. 30, 2004    (JP) .................... 2004-223578

(51) Int. Cl.
*G06K 9/00* (2006.01)
(52) U.S. Cl. .................. 382/117; 382/118; 382/115
(58) Field of Classification Search .......... 382/118, 382/117, 115
See application file for complete search history.

(56) References Cited

U.S. PATENT DOCUMENTS

| | | | | |
|---|---|---|---|---|
| 4,641,349 A * | 2/1987 | Flom et al. | ..... | 382/117 |
| 5,130,789 A * | 7/1992 | Dobbs et al. | ..... | 358/500 |
| 5,748,764 A * | 5/1998 | Benati et al. | ..... | 382/117 |
| 5,990,973 A * | 11/1999 | Sakamoto | ..... | 348/576 |
| 6,028,949 A * | 2/2000 | McKendall | ..... | 382/117 |
| 6,292,574 B1 * | 9/2001 | Schildkraut et al. | ..... | 382/117 |
| 6,728,401 B1 | 4/2004 | Hardeberg | ..... | 382/167 |
| 7,024,035 B1 * | 4/2006 | Enomoto | ..... | 382/167 |
| 7,088,855 B1 * | 8/2006 | Vide | ..... | 382/167 |
| 7,116,820 B2 * | 10/2006 | Luo et al. | ..... | 382/167 |
| 7,127,108 B2 * | 10/2006 | Kinjo et al. | ..... | 382/203 |

(Continued)

FOREIGN PATENT DOCUMENTS
EP    0961225 A2    12/1999
(Continued)

OTHER PUBLICATIONS
Towards—removal., Smolka et al.,Elsevier, 0167-8655, 2003, pp. 1767-1785.*

(Continued)

*Primary Examiner* — Jayesh A Patel
(74) *Attorney, Agent, or Firm* — Fitzpatrick, Cella, Harper & Scinto

(57) ABSTRACT

An eye region is detected, in the detected eye region, the region of an iris outline is extended inward, and a hollow region surrounded by the extended region is detected as a poor hue quality region. An outline of the poor hue quality region is shaped by approximating the outline to one of a circle and an ellipse. The hue of the shaped poor hue quality region is corrected on the basis of color information obtained from a neighboring region inside an iris outline.

12 Claims, 14 Drawing Sheets

U.S. PATENT DOCUMENTS

| | | | |
|---|---|---|---|
| 7,403,654 B2 * | 7/2008 | Wu et al. | 382/167 |
| 7,416,302 B2 * | 8/2008 | Tisse | 351/209 |
| 7,852,533 B2 * | 12/2010 | Park et al. | 358/523 |
| 7,894,666 B2 * | 2/2011 | Mitarai et al. | 382/167 |
| 2002/0126893 A1 * | 9/2002 | Held et al. | 382/167 |
| 2003/0007687 A1 | 1/2003 | Nesterov et al. | 382/167 |
| 2003/0021478 A1 * | 1/2003 | Yoshida | 382/195 |
| 2003/0044063 A1 * | 3/2003 | Meckes et al. | 382/165 |
| 2003/0068084 A1 | 4/2003 | Kinjo et al. | 382/164 |
| 2003/0137680 A1 | 7/2003 | Maruoka | 358/1.13 |
| 2004/0240747 A1 * | 12/2004 | Jarman et al. | 382/274 |
| 2005/0047656 A1 * | 3/2005 | Luo et al. | 382/167 |
| 2005/0140801 A1 * | 6/2005 | Prilutsky et al. | 348/239 |
| 2005/0196067 A1 * | 9/2005 | Gallagher et al. | 382/275 |
| 2005/0207649 A1 * | 9/2005 | Enomoto et al. | 382/190 |
| 2005/0220346 A1 * | 10/2005 | Akahori | 382/190 |
| 2005/0238230 A1 * | 10/2005 | Yoshida | 382/167 |
| 2005/0286766 A1 * | 12/2005 | Ferman | 382/190 |
| 2006/0098867 A1 * | 5/2006 | Gallagher | 382/167 |

FOREIGN PATENT DOCUMENTS

| | | |
|---|---|---|
| EP | 961225 A2 * | 12/1999 |
| JP | 05-224271 | 9/1993 |
| JP | 06-258732 | 9/1994 |
| JP | 06-350914 | 12/1994 |
| JP | 09-322192 | 12/1997 |
| JP | 2907120 | 4/1999 |
| JP | 11-284874 | 10/1999 |
| JP | 3036285 | 2/2000 |
| JP | 2000-278510 | 6/2000 |
| JP | 2002-305667 | 10/2002 |
| JP | 2004-208132 | 7/2004 |
| WO | WO 03/071484 | 8/2003 |
| WO | WO 03/071484 A1 | 8/2003 |
| WO | WO 03071484 A1 * | 8/2003 |

OTHER PUBLICATIONS

B. Smolka et al., "Towards Automatic Redeye Effect Removal"; *Pattern Recognition Letters*, North-Holland Publ. Amsterdam, NL. vol. 24, No. 11, Jul. 2003, pp. 1767-1785 XP004416063.

Y. LeCun et al. "Convolutional Networks for Images, Speech, and time Series"; The Handbook of Brain Theory and Neural Networks; The MIT Press. London England, pp. 255-258.

* cited by examiner

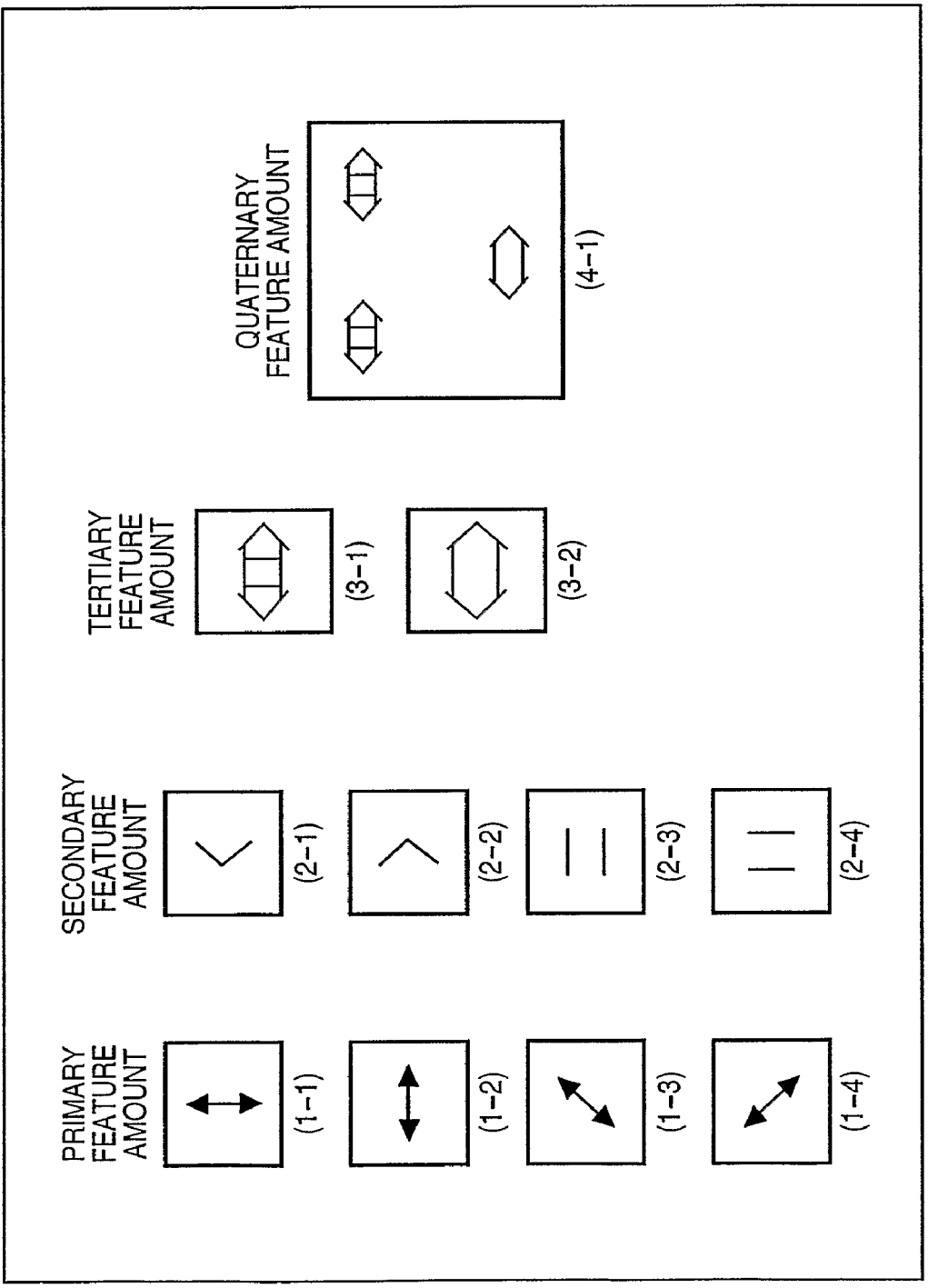

F I G. 9
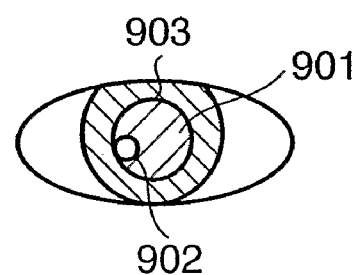

F I G. 10
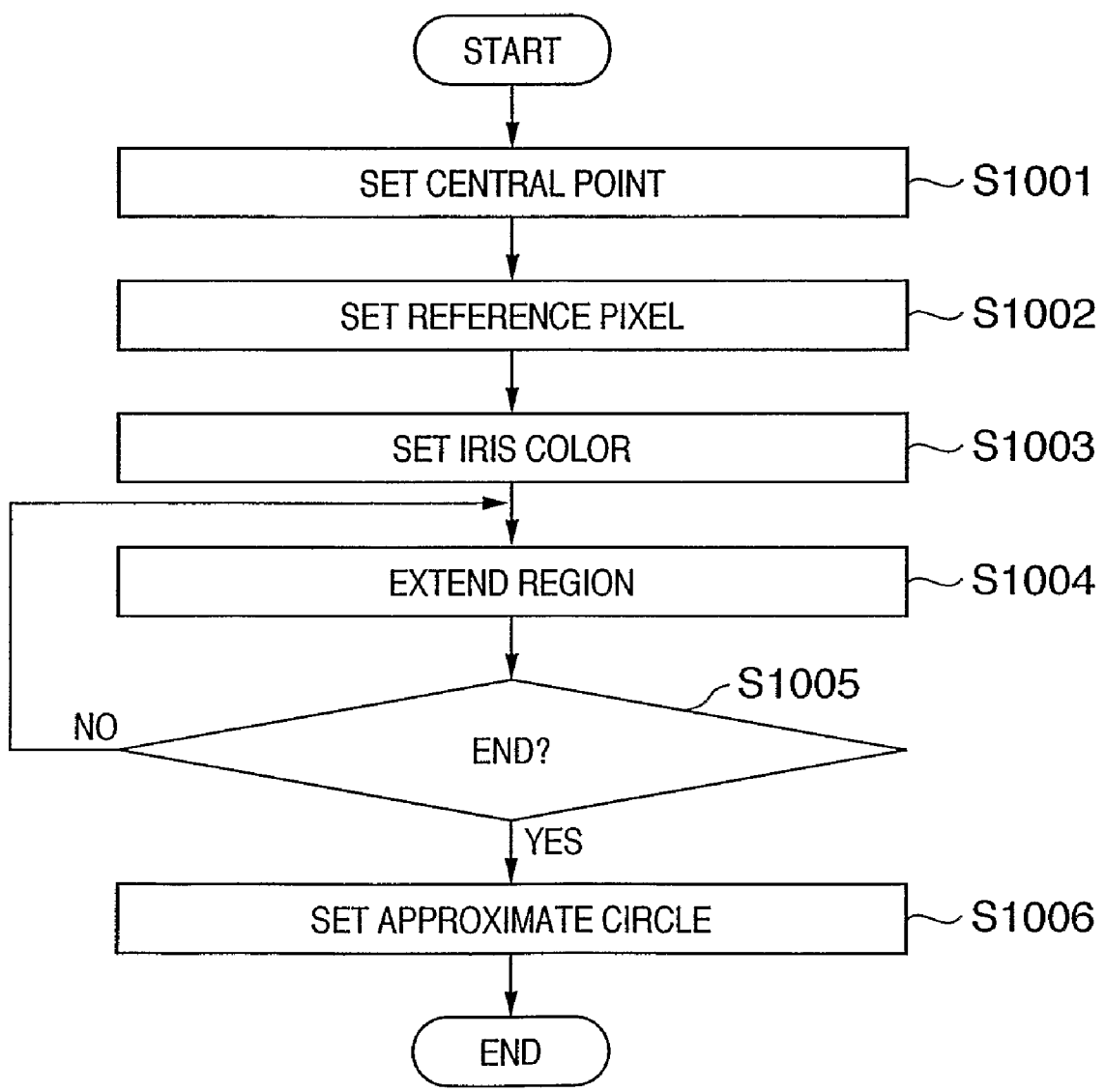

IMAGE PROCESSING APPARATUS AND METHOD, IMAGE SENSING APPARATUS, AND PROGRAM

TECHNICAL FIELD

The present invention relates to an image processing apparatus and method which automatically detect and correct a poor hue quality region in an input image and, more particularly, to an image processing apparatus and method which automatically detect and correct a poor hue quality region such as a red-eye occurred in an eye region when an image is obtained by using an electronic flash.

BACKGROUND ART

A phenomenon called a red-eye is conventionally known in which an eye region of a human image obtained by using an electronic flash becomes red. This phenomenon occurs when a flash light is reflected by the retina of an eye, and the image of the reflected light is formed again. As a result, the eye region is sensed in red, i.e., the color of blood vessels in the retina.

Several techniques have been disclosed in relation to detection or correction of a red-eye region. As the number of pixels of a digital camera increases, and high-resolution printers are being developed now, correction of a poor hue quality region such as a red-eye region must also be executed accurately.

In some techniques of detecting or correcting a red-eye region, the size of a red-eye is predicted on the basis of image sensing conditions, and a red-eye region is determined on the basis of the predicted size and color information (e.g., Japanese Patent Laid-Open No. 5-224271). In other techniques, a red-eye region is recognized by using color information and a degree of circular shape (e.g., Japanese Patent Laid-Open No. 6-350914). Alternatively, low saturation or low illuminance regions, flesh color regions, and red regions are obtained from an image, and a red region located in a low saturation or low illuminance region in a flesh color region is recognized as a red-eye region (e.g., Japanese Patent No. 3036285).

In the above-described techniques, a red region is obtained from an image first. Then, a red-eye region is detected by using the size or shape of the red region. However, it is difficult to detect a region, where a red-eye is generated, from an entire image by using color information. The red color intensity of a red-eye changes between individuals and also depending on illumination conditions. For this reason, it is hard to set a threshold value which allows to detect all red-eye regions. For example, when the threshold value is high, red-eye region detection fails at a high probability. When the threshold value is low, a reddish skin or an object under incandescent light may also be detected. In these situations, it is not practical to accurately detect the degree of circular shape or size. In addition, it is difficult to detect a flesh color for practical use, as is well known.

Furthermore, red color component value distribution in a red-eye region is not always uniform. The red color component in a red-eye region often changes. For this reason, when a red-eye region is detected on the basis of a simple threshold value, only part of a red-eye region may be detected. When only the detected region is corrected, the corrected image may look strange.

In a technique to prevent this, a user designates the approximate position of one red-eye region, and if the other red-eye region is present, executes region extension from the reddest pixel to peripheral region, thereby detecting the red-eye region. Alternatively, a plurality of red regions are obtained, and a region, looked like red-eye most, is detected on the basis of the position, shape, and color information of the regions (e.g., Japanese Patent No. 2907120).

There is also a red-eye detection/correction technique which requires no involvement by a user (e.g., Japanese Patent Laid-Open No. 2002-305667). In this technique, face detection or eye detection is done first to identify regions which can contain a poor hue quality at a high probability. Next, the red color component is enhanced to identify the outlines and central points of obtained poor hue quality region candidates. Whether the hue of each poor hue quality region has a poor quality, i.e., whether the region is a red-eye region is determined. If the region is determined as a red-eye region, a correction mask to correct the poor hue quality is created. In addition, a red-eye defective region is obtained by using a fuzzy function. By examining neighboring pixels around the maximum value of the red-eye detect, the correction mask is extended circularly without crossing over the outline.

In the above-described red-eye region extension, it is important to determine to which extent the region should be extended, i.e., the end of region extension. In Japanese Patent No. 2907120, region extension is executed circularly, or an iris edge is detected, and extension is done up to the region inside the edge. In Japanese Patent Laid-Open No. 2002-305667, the size and the degree of eccentricity of the region and the outline data of each poor hue quality region candidate are used.

However, there is a difference in shape of eye region between individuals. Not all people have the circular iris region visibly, and some are slit-eyed persons. Hence, the region cannot simply be extended circularly. To determine the end of region extension, the size or the degree of circular shape of the detected region is used. For a slit-eyed person, the shape of the iris in the image is close to oblong rather than circular. Additionally, in some cases, a small bright region called "catch light" where the light source is reflected is present in the iris region. Since region extension based on the red color component distribution is done except the catch light region, the extended region is not circular. For this reason, the region extension end determination may fail.

That is, in Japanese Patent No. 2907120, region extension is ended when the degree of circular shape is lower than a given threshold value. In the above-described case, region extension may be ended even when a poor hue quality region still remains. As described above, even when region extension is executed, the poor hue quality region cannot accurately be detected unless the end of region extension is accurately determined.

To correct the detected poor hue quality region, generally, the luminance value of each pixel in the region detected as the poor hue quality region is decreased. Alternatively, the R value of each pixel in the region is set to a lower one of the B and G values. For example, Japanese Patent Laid-Open No. 5-224271 describes a technique of turning the color to black by reducing the luminance. Japanese Patent Laid-Open No. 2002-305667, after holes or noise of an obtained correction mask is removed, the defective region is corrected on the basis of Rnew=R−m(R−min(G,B)) where m is the red-eye defect probability corresponding to the grayscale value of the correction mask. In another correction processing, a red-eye region is replaced with the data of a non-red-eye region held in advance.

However, the iris color changes between individuals, and the brightness of iris also changes depending on illumination conditions. For these reasons, an unnatural image may be obtained when the luminance is simply reduced, or the red-eye region is replaced with an eye region sensed under different conditions. That is, it is demanded to correct the color to the iris color under normal sensing conditions.

If the poor hue quality region is not accurately detected, the corrected image looks unnatural because it contains both corrected pixels and uncorrected pixels with poor hue quality after correcting the detected region. That is, an unnatural image is obtained which contains a corrected region with normal hue and a poor hue quality region such as a red-eye region. Since the resolution of a current digital camera or printer is high, as described above, an image containing an incompletely corrected region becomes unnatural. Accordingly, the entire poor hue quality region must be detected and corrected accurately.

It is an object of the present invention to easily and accurately detect a poor hue quality region in an image and naturally correct it.

DISCLOSURE OF INVENTION

In order to achieve an object of the present invention, for example, an image processing method of the present invention comprises the following arrangement.

That is, an image processing method characterized by comprising:

an input step of inputting an image;

an eye region detection step of detecting an eye region from the input image;

a poor hue quality region detection step of detecting a poor hue quality region in the eye region;

a poor hue quality region shaping step of shaping the poor hue quality region; and a poor hue quality region correction step of correcting a hue of the shaped poor hue quality region.

In order to achieve an object of the present invention, for example, an image processing method of the present invention comprises the following arrangement.

That is, an image processing method characterized by comprising:

an input step of inputting an image;

an eye region detection step of detecting an eye region from the input image;

a poor hue quality region detection step of detecting a poor hue quality region in the eye region; and a poor hue quality region correction step of correcting a hue of the poor hue quality region on the basis of color information obtained from a neighboring region inside an iris outline.

In order to achieve an object of the present invention, for example, an image processing method of the present invention comprises the following arrangement.

That is, an image processing method characterized by comprising:

an input step of inputting an image;

an eye region detection step of detecting an eye region from the input image;

a poor hue quality region detection step of detecting a poor hue quality region in the eye region by executing region extension until color information of an adjacent pixel of an outline of an extended region matches color information obtained from an iris outline region and detecting the poor hue quality region from the extended region; and a poor hue quality region correction step of correcting a hue of the poor hue quality region.

In order to achieve an object of the present invention, for example, an image processing method of the present invention comprises the following arrangement.

That is, an image processing method characterized by comprising:

an input step of inputting an image;

an eye region detection step of detecting an eye region from the input image;

a poor hue quality region detection step of extending an iris outline region inward in the eye region and detecting, as a poor hue quality region, a hollow region surrounded by the extended region; and a poor hue quality region correction step of correcting a hue of the poor hue quality region.

In order to achieve an object of the present invention, for example, an image processing method of the present invention comprises the following arrangement.

That is, an image processing method characterized by comprising:

an input step of inputting an image;

an eye region detection step of detecting an eye region from the input image;

a poor hue quality region detection step of detecting a poor hue quality region of the eye region;

a non-correction region detection step of detecting a non-correction region from the eye region; and a poor hue quality region correction step of correcting a hue of a region obtained by excluding the non-correction region from the poor hue quality region.

In order to achieve an object of the present invention, for example, an image processing method of the present invention comprises the following arrangement.

That is, an image processing method characterized by comprising:

an input step of inputting an image;

an eye region detection step of detecting an eye region from the input image;

a non-evaluation region setting step of setting a non-evaluation region which is not used for poor hue quality region detection;

a poor hue quality region detection step of detecting a poor hue quality region in the eye region without using the non-evaluation region; and a poor hue quality region correction step of correcting a hue of the poor hue quality region.

In order to achieve an object of the present invention, for example, an image processing apparatus of the present invention comprises the following arrangement.

That is, an image processing apparatus characterized by comprising:

input means for inputting an image;

eye region detection means for detecting an eye region from the input image;

poor hue quality region detection means for detecting a poor hue quality region in the eye region;

poor hue quality region shaping means for shaping the poor hue quality region; and poor hue quality region correction means for correcting a hue of the shaped poor hue quality region.

In order to achieve an object of the present invention, for example, an image processing apparatus of the present invention comprises the following arrangement.

That is, an image processing apparatus characterized by comprising:

input means for inputting an image;

eye region detection means for detecting an eye region from the input image;

poor hue quality region detection means for detecting a poor hue quality region in the eye region; and poor hue quality region correction means for correcting a hue of the poor hue quality region on the basis of color information obtained from a neighboring region inside an iris outline.

In order to achieve an object of the present invention, for example, an image processing apparatus of the present invention comprises the following arrangement.

That is, an image processing apparatus characterized by comprising:

input means for inputting an image;

eye region detection means for detecting an eye region from the input image;

poor hue quality region detection means for executing region extension until color information of an adjacent pixel of an outline of an extended region matches color information obtained from an iris outline region and detecting a poor hue quality region from the extended region; and poor hue quality region correction means for correcting a hue of the poor hue quality region.

In order to achieve an object of the present invention, for example, an image processing apparatus of the present invention comprises the following arrangement.

That is, an image processing apparatus characterized by comprising:

input means for inputting an image;

eye region detection means for detecting an eye region from the input image;

poor hue quality region detection means for extending an iris outline region inward in the eye region and detecting, as a poor hue quality region, a hollow region surrounded by the extended region; and poor hue quality region correction means for correcting a hue of the poor hue quality region.

In order to achieve an object of the present invention, for example, an image processing apparatus of the present invention comprises the following arrangement.

That is, an image processing apparatus characterized by comprising:

input means for inputting an image;

eye region detection means for detecting an eye region from the input image;

poor hue quality region detection means for detecting a poor hue quality region of the eye region;

non-correction region detection means for detecting a non-correction region from the eye region; and poor hue quality region correction means for correcting a hue of a region obtained by excluding the non-correction region from the poor hue quality region.

In order to achieve an object of the present invention, for example, an image processing apparatus of the present invention comprises the following arrangement.

That is, an image processing apparatus characterized by comprising:

input means for inputting an image;

eye region detection means for detecting an eye region from the input image;

non-evaluation region setting means for setting a non-evaluation region which is not used for poor hue quality region detection;

poor hue quality region detection means for detecting a poor hue quality region in the eye region without using the non-evaluation region; and poor hue quality region correction means for correcting a hue of the poor hue quality region.

In order to achieve an object of the present invention, for example, an image sensing apparatus of the present invention comprises the following arrangement.

That is, an image sensing apparatus characterized by comprising:

image sensing means; and an image processing apparatus of any one of claims 19 to 24, wherein a poor hue quality region of an image sensed by the image sensing means is detected and corrected by the image processing apparatus.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 7 is a view showing hierarchical subject detection;

FIG. 9 is a view for explaining a second non-evaluation region;

FIG. 10 is a flowchart of poor hue quality region detection processing according to the first embodiment;

BEST MODE FOR CARRYING OUT THE INVENTION

Preferred embodiments of the present invention will now be described in detail in accordance with the accompanying drawings.

(First Embodiment)

Figure 1:
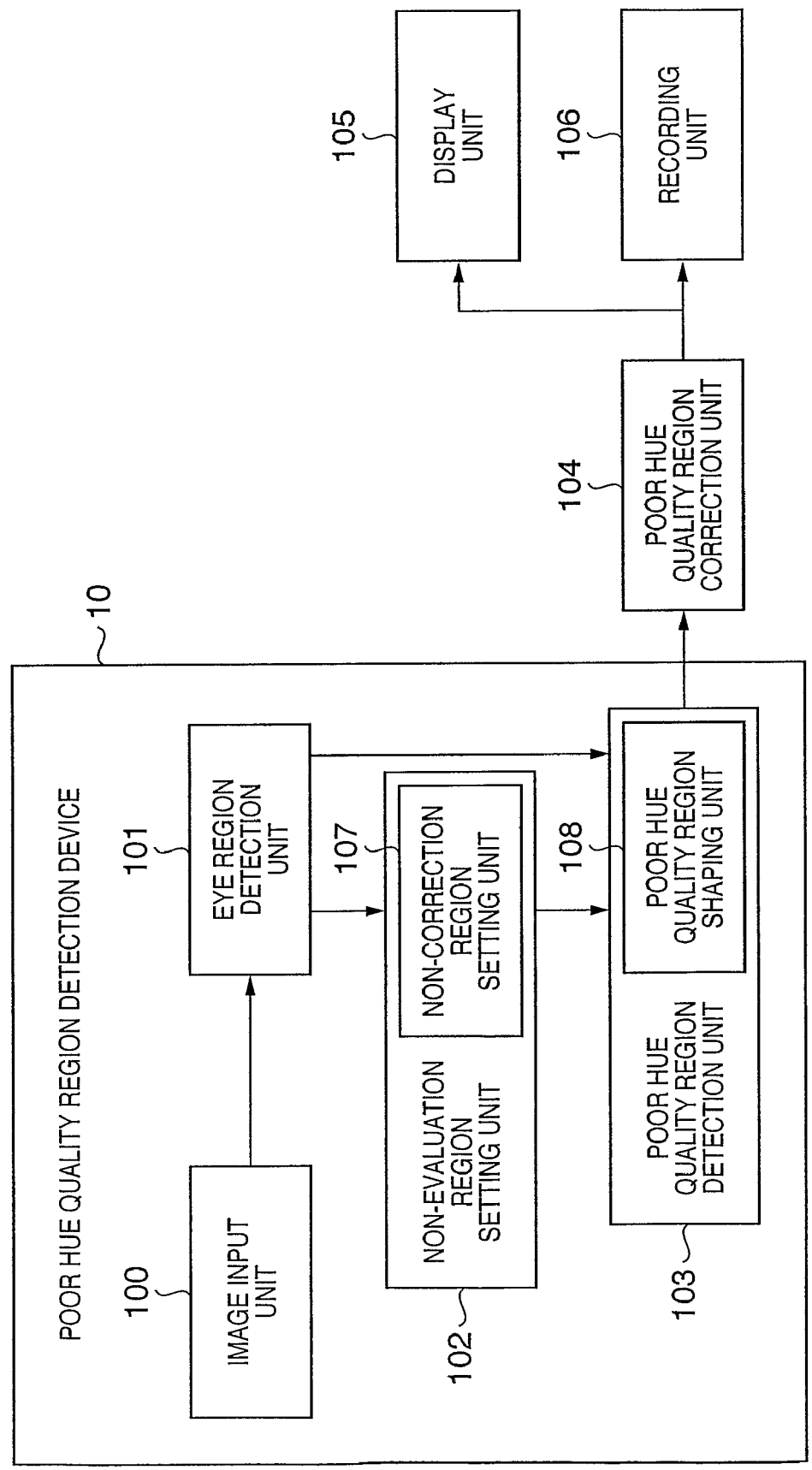
FIG. 1 is a block diagram showing the functional arrangement of an image processing apparatus according to the first embodiment.

FIG. 1 is a block diagram showing the arrangement of an image processing apparatus according to this embodiment. The image processing apparatus comprises a poor hue quality region detection device 10, poor hue quality region correction unit 104, display unit 105, and recording unit 106.

The poor hue quality region detection device 10 includes an image input unit 100, eye region detection unit 101, non-evaluation region setting unit 102, poor hue quality region detection unit 103, non-correction region setting unit 107, and poor hue quality region shaping unit 108.

The image input unit 100 inputs an image to be processed by this system. More specifically, the image input unit 100 is an image sensing unit or scanner including a lens and CCD, or a module to read out an image file. An image sensing unit can detect and correct a poor hue quality of a sensed image.

The eye region detection unit 101 detects an eye region in the image input by the image input unit 100.

In region extension processing executed when a poor hue quality region such as a red-eye region is detected, the non-evaluation region setting unit 102 sets a non-evaluation region which is excluded from a region to be evaluated for determining termination of region extension.

The poor hue quality region detection unit 103 detects a poor hue quality region such as a red-eye by using the eye region detected by the eye region detection unit 101 and the non-evaluation region set by the non-evaluation region setting unit 102. The poor hue quality region is evaluated to determine the end of region extension processing. The region when the end is determined is set as a poor hue quality region.

The poor hue quality region correction unit 104 corrects the hue of the poor hue quality region detected by the poor hue quality region detection unit 103.

The display unit 105 displays the image corrected by the poor hue quality region correction unit 104. The recording unit 106 records the image corrected by the poor hue quality region correction unit 104.

The non-correction region setting unit 107 sets a region which should not be corrected by the poor hue quality region correction unit 104.

The poor hue quality region shaping unit 108 shapes the poor hue quality region detected by the poor hue quality region detection unit 103.

The operation of the arrangement shown in FIG. 1 will be described with reference to the flowchart in FIG. 2. In an image input step S201, the image input unit 100 inputs an image. The input image is input to the eye region detection unit 101.

In an eye region detection step S202, the eye region detection unit 101 executes processing of detecting an eye region from the input image. The processing executed by the eye region detection unit 101 will be described. First, the eye region detection unit 101 detects a face region in the image input by the image input unit 100. An eye region is then set by using the face region detection result and an eye detection result obtained as the intermediate processing result of face detection processing.

The face detection processing will be described with reference to FIG. 7. FIG. 7 shows a process of detecting a face by hierarchical processing. In the operation schematically shown in FIG. 7, local features are detected in a layer, the detection results are integrated, and more complex local features of the next layer level are detected. By repeating this processing, a face as a subject is finally detected. That is, first, primary features as primitive features are detected. Secondary features are detected by using the primary feature detection result (detection level and positional relationship). Tertiary features are detected by using the secondary feature detection result. Finally, a face as a quaternary feature is detected by using the tertiary feature detection result.

Referring to FIG. 7, first, a vertical feature (1-1), horizontal feature (1-2), diagonal-right-up feature (1-3), and diagonal-right-down feature (1-4) are detected as primary features. The vertical feature (1-1) indicates an edge segment in the vertical direction (the same shall apply hereinafter). The detection result of each feature is output as a detection result image having the same size as the input image. In this example, four kinds of detection result images are obtained. By checking the value of the position of the detection result image of each feature, it can be determined whether the feature is present at that position of the input image.

Secondary features are detected in the following way. The right-open V-shaped (2-1) feature is detected from the diagonal-right-up feature and diagonal-right-down feature. The left-open V-shaped (2-2) feature is detected from the diagonal-right-down feature and diagonal-right-up feature. The horizontal parallel line feature (2-3) is detected from the horizontal feature. The vertical parallel line feature (2-4) is detected from the vertical feature.

Tertiary features, i.e., an eye feature (3-1) and mouth feature (3-2) are detected in the following way. The eye feature is detected from the right-open V-shaped feature, left-open V-shaped feature, horizontal parallel line feature, and vertical parallel line feature. The mouth feature is detected from the right-open V-shaped feature, left-open V-shaped feature, and horizontal parallel line feature. A face feature (4-1) as a quaternary feature is detected from the eye feature and mouth feature.

Figure 3A:
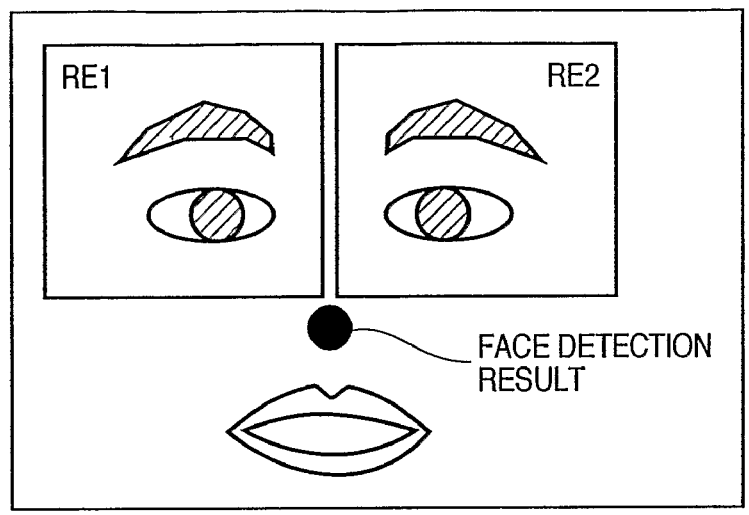
FIGS. 3A to 3D are views showing eye detection results.

As described above, the eye region detection unit 101 first detects primitive local features. Then, local features are detected hierarchically by using the detection results. Finally, a face is detected. An eye region is set on the basis of the detection result of the eye feature (3-1) in a predetermined vicinity region in the face detection region. FIGS. 3A to 3D schematically show a face detection result and eye region detection results. FIG. 3A shows the face detection result and predetermined vicinity regions.

Figure 3B:
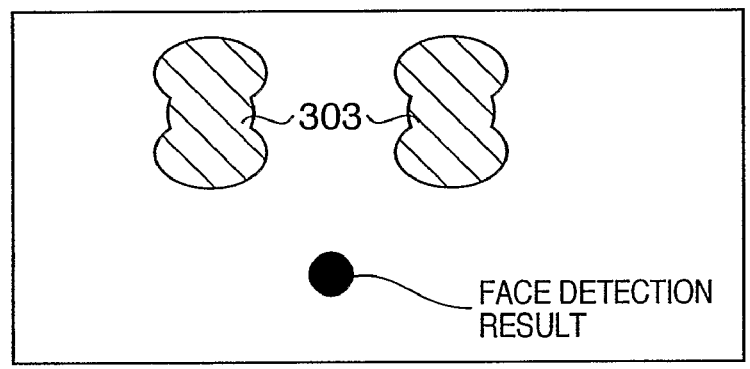
Figure 3C:
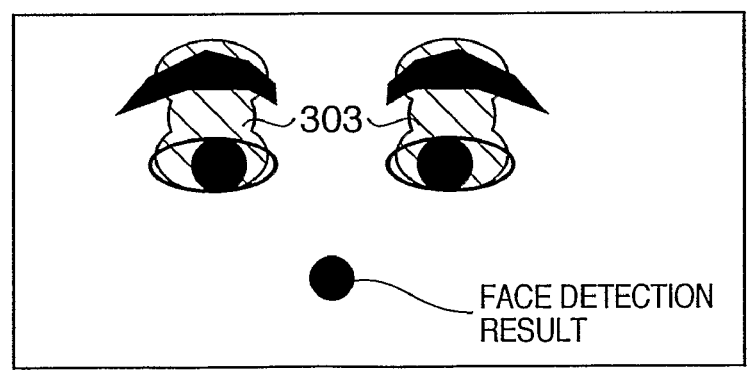
Figure 3D:
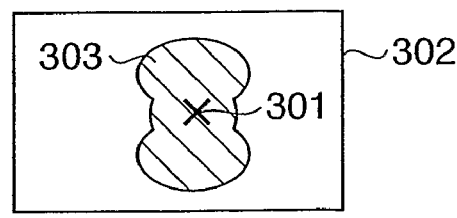

An eye feature detection result is often erroneously detected in a region such as background except the face which is similar to the eye feature. First, a face is detected. Vicinity regions RE1 and RE2 are set on the basis of the face detection result. By using only the eye feature detection result in each vicinity region, an eye region is set as a region having a predetermined size and predetermined shape containing the eye feature detection result. A set eye region 302 is shown in FIG. 3D. To set the eye region, the center (301) of an eye feature detection result 303 is obtained. Then, a region which is so large that the eye feature detection result 303 is contained is set as the eye region.

The above-described detection method can also be implemented by using a neural network which recognizes an image by parallel hierarchical processing. This method is described in M. Matsugu, K. Mori, et al, "Convolutional Spiking Neural Network Model for Robust Face Detection", 2002, International Conference On Neural Information Processing (ICONIP02). The processing contents of a neural network will be described with reference to FIG. 8. The neural network hierarchically processes information related to recognition (detection) of a target or geometrical feature in a local region of input data. Its basic structure is a so-called convolutional network structure (Le Cun, Y, and Bengio, Y., 1995, "Convolutional Networks for Images Speech, and Time Series" in Handbook of Brain Theory and Neural Networks (M. Arbib, Ed.), MIT Press, pp. 255-258). In the final layer (uppermost layer), the presence/absence of a subject to be detected, and if it is present, its position information on input data are obtained.

A data input layer 801 inputs image data. A first feature detection layer 802 (1,0) detects the low-order local features of an image pattern input from the data input layer 801 equal in number to a plurality of feature categories at the same position at a plurality of scale levels or resolutions in local regions each having a point on the entire screen as the center. Noted that the low-order local features may contain color component features as well as geometrical features such as a specific direction component and specific spatial frequency component. The local regions can be each having, as the center, a predetermined sampling point on the entire screen.

A feature integration layer 803 (2,0) has a predetermined receptor field structure (a receptor field will indicate the connection range to an output element of the immediately preceding layer, and a receptor field structure will indicate the connection weight distribution hereinafter). The feature integration layer 803 executes integration of the outputs from a plurality of neuron elements in the same receptor field from the feature detection layer 802 (1,0). This integration processing is an operation such as local averaging or sub-sampling by maximum output detection, and has a function of permitting a positional shift or deformation by spatially obscuring the output from the feature detection layer 802 (1,0). The receptor fields of the neurons in the same feature integration layer have a common structure.

Of the succeeding feature detection layers 802 ((1,1), (1,2), . . . , (1,M)) and feature integration layer 803 ((2,1), (2,2), . . . , (2,M)), the former ((1,1), . . . ) detects a plurality of different features in each feature detection module, and the latter ((201), . . . ) integrates detection results related to the plurality of features from the preceding feature detection layer. The feature detection layer is connected (wired) to receive the outputs from neuron elements of the preceding feature integration layer belonging to the same channel. In sub-sampling executed by the feature integration layer, outputs from local regions (local receptor fields of the feature integration layer) from feature detection neuron sets of the same feature category are averaged.

Figure 8:
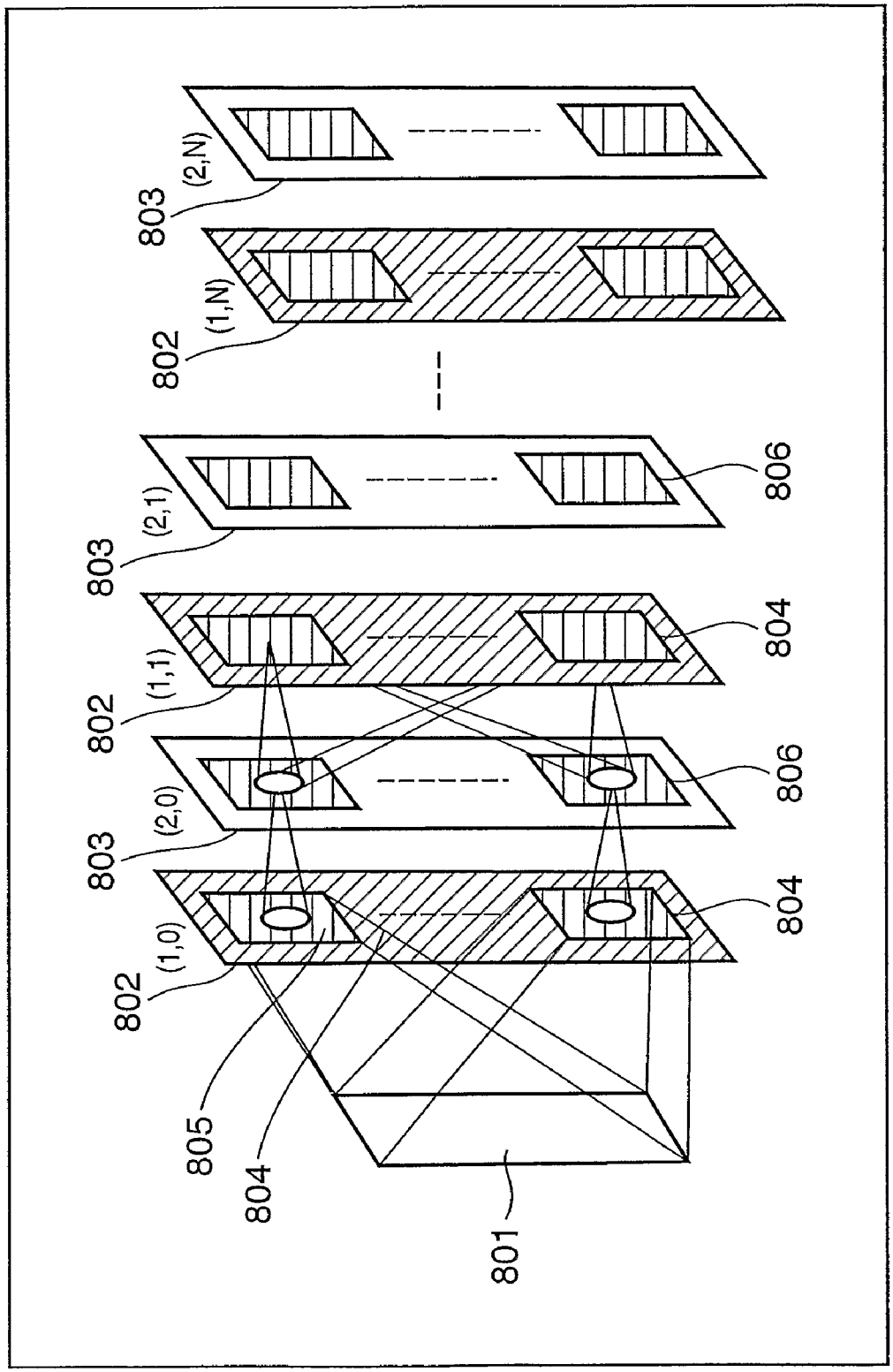
FIG. 8 is a view showing a hierarchical neural network.

To detect the features shown in FIG. 7 at the respective positions in the input image, a common receptor field structure to detect a feature is formed for the neurons used for detection in the feature detection layers shown in FIG. 8. In addition, receptor field structures corresponding to different sizes or rotation amounts are prepared for face detection in the final face detection layer. When the presence of a face is detected by face feature detection, face data such as the size and direction of the face can be obtained on the basis of the receptor field structure used to detect the face.

When the receptor field structure is used, vicinity regions to obtain eye feature detection results corresponding to the face detection result can accurately be set. FIG. 3B schematically shows the face detection result and eye feature detection results corresponding to the face detection result. FIG. 3C schematically shows the eye feature detection results and eye features. When the above-described neural network is used, the eye feature is obtained not as one point but as a region having a certain range. The region changes depending on the image but generally contains the iris of the eye wholly. In some images, the region may contain an eyebrow region, as shown in FIG. 3C.

In a non-evaluation region setting step S203, the non-evaluation region setting unit 102 sets a non-evaluation region in the eye region detected by the eye region detection unit 101. The non-evaluation region is not used to determine the end of region extension processing executed in detecting a poor hue quality region such as a red-eye region. As described in the background of the invention, the size or degree of circular shape of the detection region is used to determine the end of region extension. The non-evaluation region setting unit 102 sets the non-evaluation region as a region not to be used for the calculation of the degree of circular shape. More specifically, the non-evaluation region contains, e.g., a region where the iris is hidden by the eyelid and a catch light region in the iris region.

Figure 4:
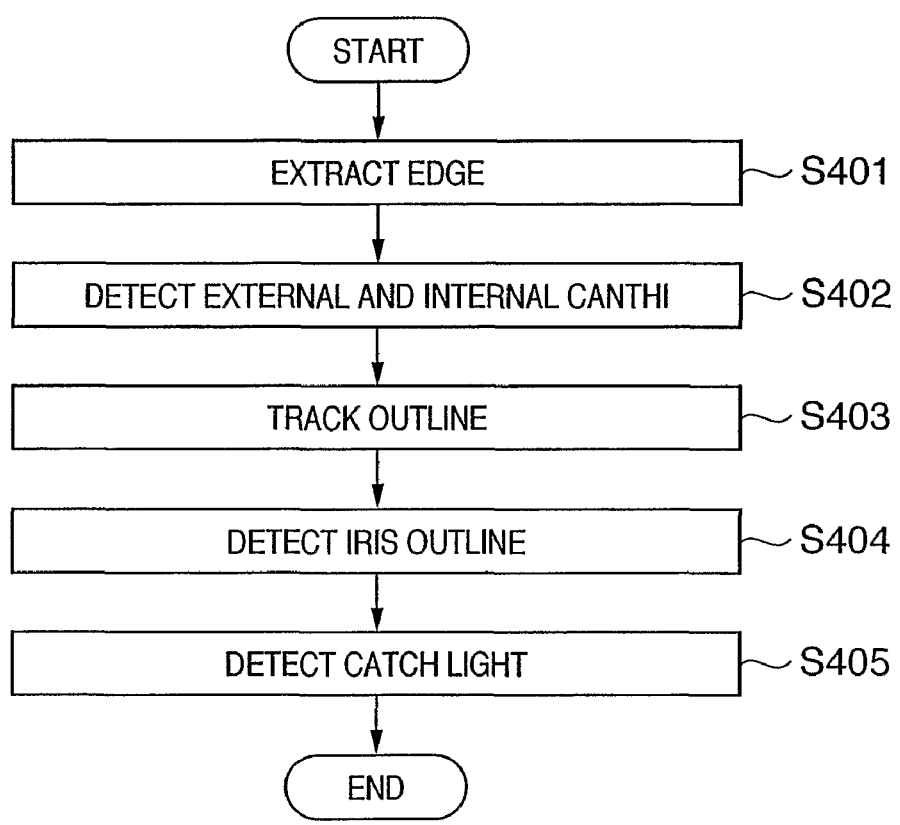
FIG. 4 is a flowchart showing a non-evaluation region setting method.
Figure 5A:
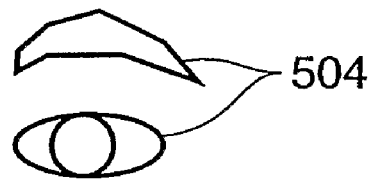
FIGS. 5A and 5B are views showing external/internal canthus detection.
Figure 5B:
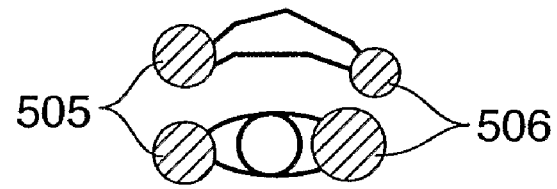

FIG. 4 is a flowchart showing non-evaluation region setting procedures. FIGS. 5A and 5B are schematic views showing non-evaluation region setting. The non-evaluation region setting method will be described below with reference to FIGS. 4, 5A, and 5B. Referring to FIG. 4, in an edge extraction step S401, edge extraction processing is executed for the eye region 302 detected in the eye region detection step S202 in the image input in the image input step S201. To detect the edge, a widely used filter such as a LOG filter can be used. Alternatively, the primary feature detection results shown in FIG. 7 may be combined to obtain an edge extraction result. FIG. 5A shows a result 504 of edge extraction. More specifically, the outline of the eye and the outline of the eyebrow are extracted by edge extraction processing, as indicated by the edge extraction result 504.

In an external/internal canthus detection step S402, the external and internal canthi are detected. Referring to FIG. 5B, reference numeral 505 denotes a region where a right-open V-shaped edge feature is detected; and 506, a region where a left-open V-shaped edge feature is detected. The right-open V-shaped edge feature and left-open V-shaped edge feature correspond to an external canthus or internal canthus. These features are detected by the processing of the eye region detection unit 101, as described with reference to FIG. 7. In addition to the external and internal canthi as correct detection results, similar features are erroneously detected in another region such as an eyebrow region. The correct external and internal canthi are detected by using only detection results in an edge extraction region 504 shown in FIG. 5A.

More specifically, the right-open V-shaped edge feature detection results 505 and left-open V-shaped edge feature detection results 506 are obtained as regions having a certain range, as shown in FIG. 5B. Of the intersections between the V-shaped edge feature detection regions and the edge extraction result obtained in the edge extraction step S401, a point which is present at the outermost end is defined as an external canthus or internal canthus. For example, the edge extraction result is binarized by using a threshold value. The right-open V-shaped edge feature detection result 505 and left-open V-shaped edge feature detection result 506 are also binarized. These values are ANDed to obtain intersections. The end point of the intersections can be detected by examining the coordinates of each intersection. At this time, an end point of an eyebrow may be detected in place of the external canthus or internal canthus. Hence, a plurality of end points are obtained, and end points located on the lower side are determined as the external and internal canthi.

In an outline tracking step S403, the outline is tracked from the external canthus point to the internal canthus point or from the internal canthus point to the external canthus point obtained in the external/internal canthus detection step S402. The outline to be tracked is the edge obtained in the edge extraction step S401. When the edge extraction result is used without any processing, the edge may discontinue. Preferably, expansion by morphology is temporarily executed, and then, narrow line formation is executed.

Figure 6A:
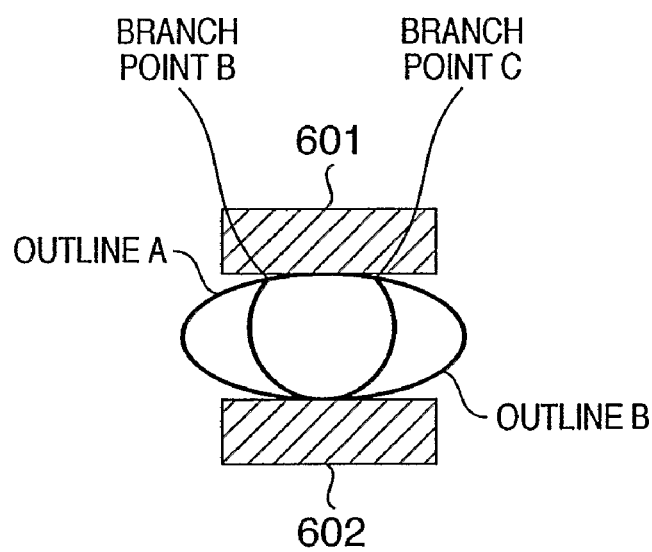
FIGS. 6A and 6B are views showing a first non-evaluation region.

Outline tracking, expansion, and narrow line formation are described in many references and, for example, in Rosenfeld, Kak, "Digital Image Processing", translated and supervised by Makoto Nagao, Kindai Kagaku Sha. When outline tracking is executed, branch points from the outline of the iris are present in some cases, as schematically shown in FIG. 6A. For example, when an outline A is tracked, branch points B and C are present halfway. This is because the eye width is smaller than the iris size. Branch points are not always present in eyes in an image. Basically, two sets of the branch points B and C are present on the upper and lower sides. The region between the two branch points is defined as a first non-evaluation region.

Figure 6B:
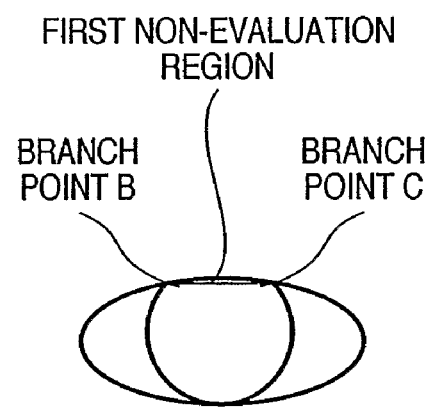

FIG. 6B shows the first non-evaluation region. A branch point can be determined when pixels in two or more directions have outlines. When outline tracking is ended, the upper outline (outline A in FIG. 6A) and lower outline (outline B in FIG. 6A) are obtained. The non-correction region setting unit 107 shown in FIG. 1 sets the region on the upper side of the upper outline as an upper eyelid region 601 and the region on the lower side of the lower outline as a lower eyelid region 602. In a poor hue quality region detection step S204, a poor hue quality region is detected so that the upper eyelid region 601 and lower eyelid region 602 contain no poor hue quality region (to be described later).

In an iris outline detection step S404, the branch points obtained by outline tracking in the outline tracking step S403 are tracked to detect an iris outline. According to the examination by the present inventor, almost all examined persons had branch points between the iris of an eye and one of the upper and lower outlines of the eye. Hence, when tracking is done from the branch point, the outline of the iris can be detected. If an eye in the image has only two branch points on the lower outline, the iris outline reaches the other branch point upon tracking.

Figure 13:
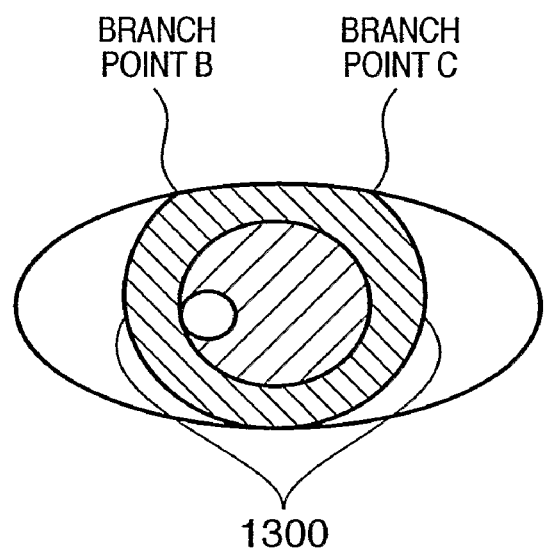
FIG. 13 is a view showing an iris outline.

If an eye in the image has two branch points on each of the upper and lower outlines, the iris outline from a branch point on the lower outline reaches an upper branch point, or the iris outline from a branch point on the upper outline reaches a lower branch point. The union of loci is the iris outline. A detected iris outline 1300 is shown in FIG. 13.

In a catch light region detection step S405, a catch light region is detected in a region obtained by the first non-evaluation region determined in the outline tracking step S403 and the iris outline detected in the iris outline detection step S404. Catch light is a technique of causing a pupil to reflect light applied to it. With this catch light, the sensed face becomes expressive. When an electronic flash is used, an image with catch light is often obtained.

Catch light is the reflected light of flash light, as described above, and forms therefore a white bright point in an image. When a pixel having a red luminance value much higher than a green or blue luminance value is searched for to detect a poor hue quality region, the catch light region is not included in the poor hue quality region. FIG. 9 schematically shows this state. The outline of a poor hue quality region 901 occurred in the region of an iris 903 is extended to the boundary to a catch light region 902. The catch light region 902 is almost white, as described above. For this reason, when the region is extended on the basis of pixels containing red color components in a large amount, the poor hue quality region 901 has no circular outline but an outline with a recess on part of a circle. When this outline is used directly, the calculation accuracy of a degree of circular shape becomes low.

In this embodiment, a catch light region is detected. The outline of the catch light region is set as a second non-evaluation region and excluded from the outline to be used to evaluate the degree of circular shape of the poor hue quality region. The catch light region is present as a small bright region. Hence, such a small region is detected in a region obtained by the first non-evaluation region obtained in the outline tracking step S403 and the iris outline obtained in the iris outline detection step S404 and set as the second non-evaluation region.

As described above, when the first non-evaluation region and second non-evaluation region are set from the outline to be used to evaluate the degree of circular shape of the poor hue quality region, the accuracy of region extension end determination can be increased. An iris is circular. In general, a red-eye region finally becomes circular. Hence, it is basically necessary to determine a circular shape. However, the iris which is partially hidden by the upper and lower eyelids is not circular. The outline of the hidden region is the outline of the eyelid. Hence, this region is excluded from calculation as the first non-evaluation region. When the outline of a catch light region is contained, the outline of the red-eye region is not circular. Hence, the catch light region is excluded from calculation as the second non-evaluation region.

In the poor hue quality region detection step S204, the poor hue quality region detection unit 103 detects a poor hue quality region such as a red-eye. FIG. 10 is a flowchart of poor hue quality region detection processing.

In a central point setting step S1001, the central point of a region obtained by the iris outline and the non-evaluation region set in the non-evaluation region setting step S203 is detected. The central point is, e.g., the center of gravity of the region.

In a reference pixel setting step S1002, the reference pixel to be used in obtaining a poor hue quality region by region extension, i.e., the core of region extension is set. Basically, the central point set in the central point setting step S1001 is set as the reference pixel. However, when the central point is contained in the catch light region, a neighboring pixel which exists outside the catch light region and exists in the region obtained by the non-evaluation region and iris outline obtained in the non-evaluation region setting step S203 is set as the reference pixel.

In an iris color setting step S1003, of the pixels in the neighboring small region (to be referred to as an iris outline region) inside the iris outline set in the non-evaluation region setting step S203, pixels having high luminance values is detected. For example, the color distribution of pixels having luminance values of top 10% in the iris outline region is detected, and the average of the values is set as the color information of the iris. Generally, even when a red-eye is occurred, the entire iris rarely becomes very red as a whole. Hence, the color information of the iris (whether the pupil is blue, green, or brown) can be obtained from the color distribution of the iris outline region. The luminance or color of pixels in the iris outline region is not constant. However, the color information of a pixel having a high luminance value is similar to the color information of the iris which is normally sensed. For this reason, of the pixels in the iris outline region, color information of pixels having high luminances is used.

As another method, the color information of the iris may be estimated from the color distribution in the iris outline region. As the estimation method, for example, the data of color distribution of pixels in the iris outline region is prepared in advance in correspondence with the color information of each iris color. Each data is compared with the color distribution of the pixels in the iris outline region of the sensed image, and the color information of the iris is estimated by the maximum likelihood method.

More specifically, the color distribution of pixels having high luminance values, and for example, luminance values of top 10% in the iris outline region in normal hue without any red-eye is detected. The data of average distribution of the R, G, and B values of the pixels is prepared in advance for each iris color. As distribution of pixels in the iris outline region of the sensed image, like the data prepared in advance, for example, the color distribution of pixels having luminance values of top 10% is detected, and the average distribution of the R, G, and B values of the pixels is obtained, And then the obtained color distribution of pixels in the iris outline region is compared with the prepared color distribution data of the iris color, thereby estimating the color information of the iris by the maximum likelihood method.

In a region extension step S1004, the region is extended from the reference pixel set in the reference pixel setting step S1002 to a pixel having a color close to the color set in the iris color setting step S1003. For example, the region is extended to a pixel which indicates R, G, and B values (to be referred to as set R, G, and B values) in a range of 10% with respect to the R, G, and B values of the iris color information set in the iris color setting step S1003. In this region extension, more specifically, the set R, G, and B values are compared with the R, G, and B values of pixels around the reference pixel. Subsequently, the set R, G, and B values are compared with the R, G, and B values of pixels adjacent to pixels in the precedingly extended region. In this way, the region is extended until the R, G, and B values of all or a predetermined number (e.g., 80%) of pixels adjacent to the pixels in the precedingly extended region equal the set R, G, and B values. However, the first non-evaluation region set in the non-evaluation region setting step S203 and the region over the iris outline are not extended. When extension of the region over the first non-evaluation region is inhibited, the upper eyelid region 601 and lower eyelid region 602 set in the outline tracking step S403 do not include the poor hue quality region.

In an end determination step S1005, the degree of circular shape of the region extended in the region extension step S1004 is checked, and the end of region extension is determined. To determine the circular shape, the distances between the central point set in the central point setting step S1001 and the pixels of the outline of the extended region are obtained. When the variance is equal to or smaller than a predetermined threshold value, the shape is determined as circular. If the variation is larger than the threshold value, the shape is determined as non-circular. At this time, of the pixels in the extended region, pixels in the first non-evaluation region and second non-evaluation region set in the non-evaluation region setting step S203 are excluded from the pixels to be used to determine the circular shape. With this processing, the circular shape can accurately be determined. If the shape of the extended region is determined as circular, the flow advances to an approximate circle setting step S1006. If the shape is determined as non-circular, the extension processing in the region extension step S1004 is repeated.

The approximate circle setting step S1006 is executed by the poor hue quality region shaping unit 108 shown in FIG. 1. A circle which approximates the outline of the extended region is obtained by calculation. More specifically, an approximate circle which minimizes the sum of squares of an error between the approximate circle and the coordinates of a representative point on the outline of the extended region is obtained. The approximate circle is defined as the poor hue quality region. Even in obtaining the approximate circle, the pixels in the first non-evaluation region and second non-evaluation region set in the non-evaluation region setting step S203 are excluded from pixels to be used for calculation to obtain the approximate circle. When the approximate circle is obtained in this way, correction processing in a poor hue quality region correction step S205 can properly be executed. In order to shorten the process time, the extended region may be detected as the poor hue quality region without executing the circle approximation step S1006.

In the poor hue quality region correction step S205, the poor hue quality region correction unit 104 corrects the hue of the poor hue quality region such as a red-eye obtained in the poor hue quality region detection step S204 or approximate circle setting step S1006. Correction is done by setting the hue to an iris color set in the iris color setting step S1003. Basically, the hue is corrected by changing the color distribution without changing the luminance value. In the approximate circle obtained in the approximate circle setting step S1006, the upper eyelid region 601 and lower eyelid region 602 obtained in the outline tracking step S403 are not included in the poor hue quality region and is not corrected in the poor hue quality region correction step S205.

In a display/recording step S206, the corrected image is displayed on the display unit or recorded by the recording unit.

Figure 14:
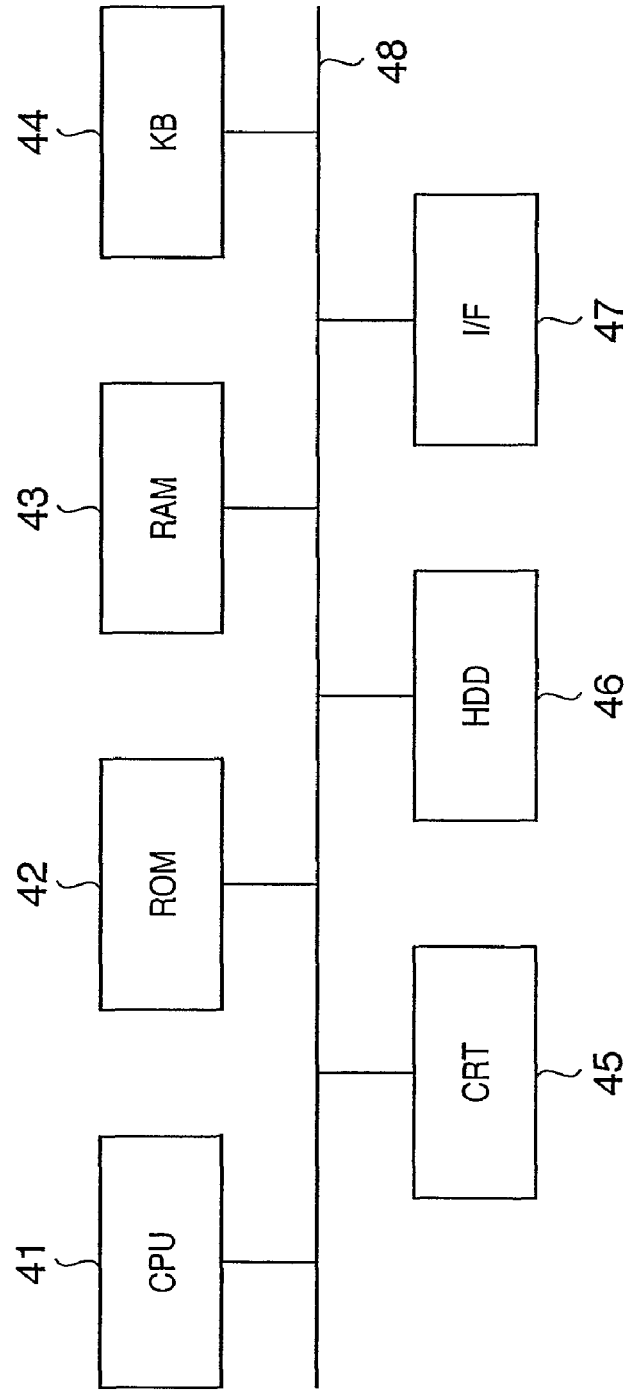
FIG. 14 is a block diagram showing the hardware configuration of an image processing apparatus.

FIG. 14 is a block diagram showing the hardware configuration of the image processing apparatus according to this embodiment. This image processing apparatus is used as part of the hue image sensing apparatus or connected to the image sensing apparatus to execute the above-described correction processing.

A CPU 41 controls the entire apparatus and also executes each processing to be described later by using programs and data stored in a ROM 42 and RAM 43.

The ROM 42 stores a boot program and set data of the apparatus.

The RAM 43 has a work area necessary for the CPU 41 in executing various kinds of processing. The RAM 43 also has an area to temporarily store the program and data loaded from an HDD 46.

A keyboard 44 is an operation unit capable of inputting various kinds of instructions from the user to the CPU 41. A pointing device such as a mouse may also be provided.

A CRT 45 is a display device capable of displaying a processing result by the CPU 41 by using a text or image. In place of the CRT 45, a liquid crystal display device may be provided.

The hard disk drive device (HDD) 46 is an external mass storage device. The HDD 46 stores the OS (Operating System), or programs and data to cause the CPU 41 to implement the functions of the units shown in FIG. 1. Some or all of them are loaded to the RAM 43 under the control of the CPU 41. The HDD 46 also stores correction data and model data. They are also loaded to the RAM 43, as needed, under the control of the CPU 41. As an external storage device, a CD or DVD drive device may be provided.

An I/F 47 is an interface for data communication with an external device. For example, image data containing a correction target can be input from a digital camera connected to the I/F 47 or downloaded from a computer. The image data is temporarily stored in the RAM 43 and processed by the CPU 41. The above-described units are connected to a bus 48.

As described above, according to this embodiment, in detecting a poor hue quality region in an image on the basis of region extension, the color distribution in the iris region is obtained in advance. Region extension is done until the same color distribution is obtained. With this processing, the repetitive number of times of region extension can be decreased. In the face detection method, primitive features are detected first, intermediate features such as V-shaped edges, eyes, and mouth are detected then, and the face is detected finally. Since the eyes and internal canthi can accurately be detected, the detection accuracy of a red-eye region to be corrected can be increased.

(Second Embodiment)

Figure 11:
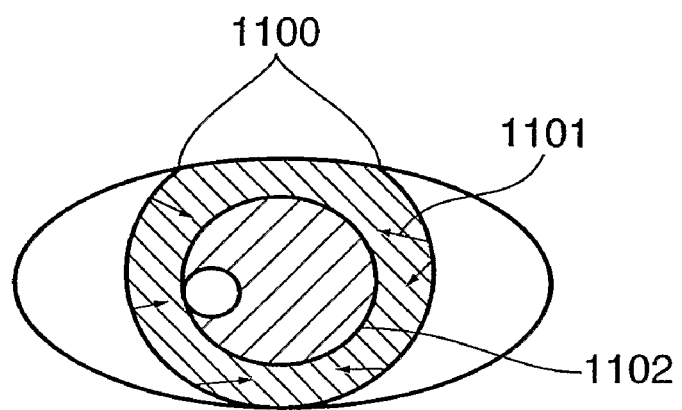
FIG. 11 is a view schematically showing the second embodiment.

In the first embodiment, in obtaining a poor hue quality region on the basis of region extension, the region is extended from a reference pixel in a region estimated as a poor hue quality to a pixel having a color closer to the set iris color. In the second embodiment, the region is extended inward on the basis of a pixel value on an iris outline, and a hollow region surrounded by that region is detected as a poor hue quality region. FIG. 11 schematically shows the characteristic of this embodiment. Referring to FIG. 11, the region is extended from an iris outline 1100 in an extension direction 1101 indicated by arrows. That is, the region to be extended in the second embodiment is different from that in the first embodiment.

Figure 2:
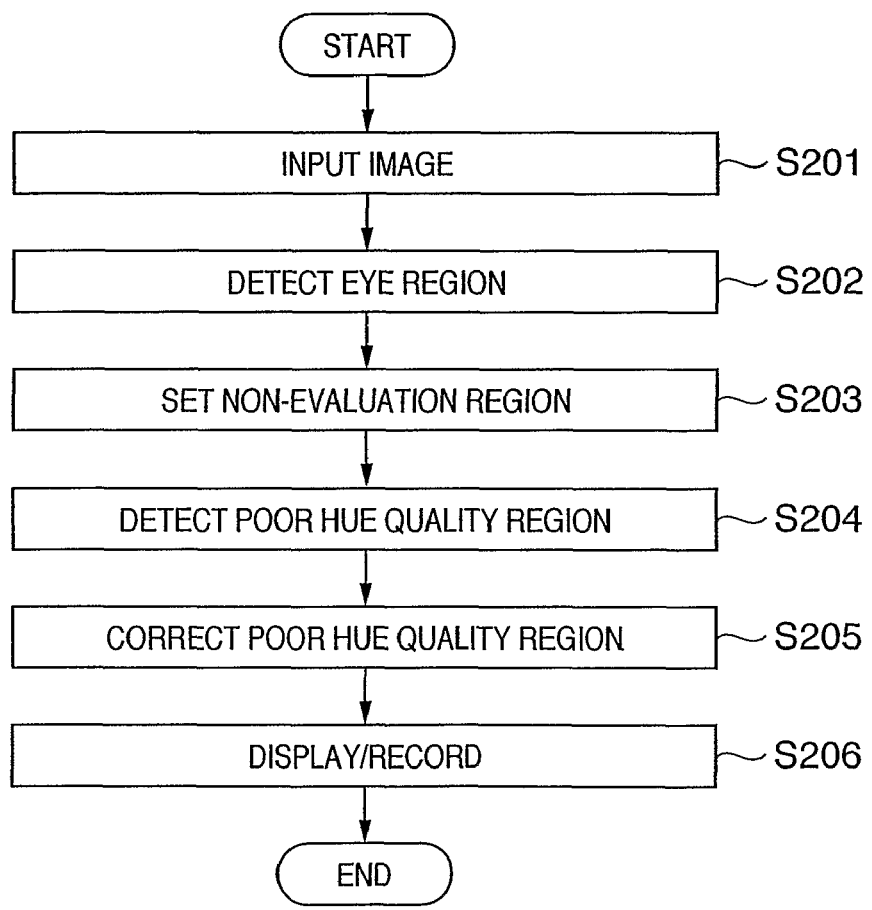
FIG. 2 is a flowchart of the first embodiment.

More specifically, in the second embodiment, the operations of the reference pixel setting step S1102 and region extension step S1004 shown in FIG. 10 and the region of which the degree of circular shape is checked in the end determination step S1005 in the poor hue quality region detection step S204 in FIG. 2 are different from those of the first embodiment.

Figure 12:
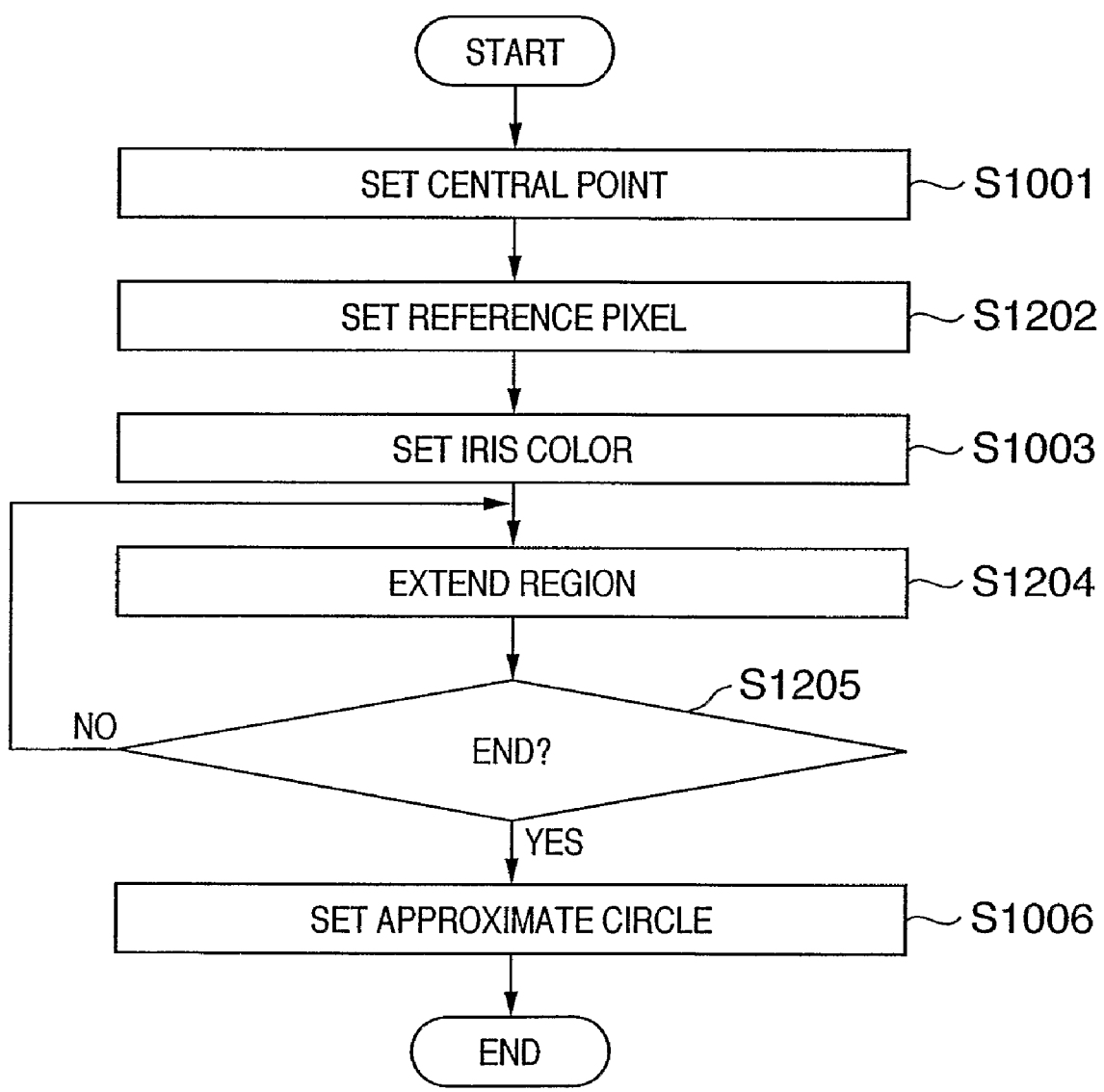
FIG. 12 is a flowchart of poor hue quality region detection processing according to the second embodiment.

FIG. 12 is a flowchart of a poor hue quality region detection step of this embodiment. As described above, a reference pixel setting step S1202, region extension step S1204, and end determination step S1205 are different from the first embodiment, and the operations of the three steps will be described below.

In the reference pixel setting step S1202, pixels on the iris outline detected in the iris outline detection step S404 in FIG. 4 are set as reference pixels.

In the region extension step S1204, the region is extended from each reference pixel set in the reference pixel setting step S1202 to a pixel having a color closer to the color set in the iris color setting step S1003. For example, the region is extended to a pixel which indicates R, G, and B values in a range of 10% with respect to the R, G, and B values of the iris color information set in the iris color setting step S1003. However, the first non-evaluation region set in the non-evaluation region setting step S203 and the region over the iris outline are not extended. That is, in the region extension step S1202, the region is extended inward from the iris outline by using the color information of the pixels on the iris outline, as shown in FIG. 11.

In the end determination step S1205, the circular shape level of an extended region outline 1102 surrounded by the region extended in the region extension step S1204 in the region obtained by the non-evaluation region and iris outline set in the non-evaluation region setting step S203 is checked, and the end of region extension is determined. FIG. 11 shows the extended region outline 1102. The method of determining the degree of circular shape is the same as in the first embodiment. Even at this time, pixels in the first non-evaluation region and second non-evaluation region set in the non-evaluation region setting step S203 are excluded from the pixels to be used to determine the circular shape.

As described above, according to the present invention, a poor hue quality region in an image is detected on the basis of region extension by using, as reference pixels, pixels on the iris outline where the color information remains even when a poor hue quality such as a red-eye is generated. For this reason, the poor hue quality region can be detected independently of the red-eye intensity.

(Other Embodiment)

The object of the present invention can also be achieved by supplying a recording medium (or storage medium) which records software program codes for implementing the functions of the above-described embodiments to a camera or computer and causing the CPU or MPU of the camera or computer to read out and execute the program codes stored in the recording medium. In this case, the program codes read out from the recording medium implement the functions of the above-described embodiments by themselves, and the recording medium which records the program codes constitutes the present invention.

The functions of the above-described embodiments are implemented not only when the readout program codes are executed by the camera or computer but also when the operating system (OS) running on the camera performs part or all of actual processing on the basis of the instructions of the program codes.

The functions of the above-described embodiments are also implemented when the program codes read out from the recording medium are written in the memory of a function expansion board inserted into the camera or computer or a function expansion unit connected to the camera or computer, and the CPU of the function expansion board or function expansion unit performs part or all of actual processing on the basis of the instructions of the program codes.

When the present invention is applied to the recording medium, it stores program codes corresponding to the above-described flowcharts.

As many apparently widely different embodiments of the present invention can be made without departing from the spirit and scope thereof, it is to be understood that the invention is not limited to the specific embodiments thereof except as defined in the appended claims.

Claim Of Priority

This application claims priority from Japanese Patent Application No. 2004-223578 filed on Jul. 30, 2004, which is hereby incorporated by reference herein.

The invention claimed is:

1. An image processing method comprising:
an input step of inputting an image;
an eye region detection step of detecting an eye region from the input image;
an iris outline detection step of detecting an iris outline from the eye region;
an iris color setting step of setting an iris color based on a color distribution of pixels having luminance values of a first predetermined ratio in a neighboring region inside the iris outline;
a region extension step of executing region extension from a reference pixel inside the iris outline so that colors of more than a second predetermined ratio of adjacent pixels in an extended region fall within a predetermined color range with respect to the set iris color, and setting the extended region as a poor hue quality region in the eye region;
a poor hue quality region shaping step of shaping the poor hue quality region; and
a poor hue quality region correction step of correcting a hue of the shaped poor hue quality region.

2. The method according to claim 1, wherein in the poor hue quality region shaping step, an outline of the poor hue quality region is shaped by approximating the outline to one of a circle and an ellipse.

3. The method according to claim 1, wherein in the poor hue quality region correction step, the hue of the poor hue quality region is corrected on the basis of the iris color.

4. The method according to claim 3, wherein, in the poor hue quality region correction step, correction is executed on the basis of color information of a pixel selected on the basis of a luminance value of the neighboring region inside the iris outline.

5. The method according to claim 1, further comprising a non-correction region detection step of detecting a non-correction region from the eye region,
wherein correction processing in the poor hue quality region correction step is executed for a region except the non-correction region detected in the non-correction region detection step.

6. The method according to claim 5, wherein the non-correction region is an eyelid region.

7. The method according to claim 1, further comprising a non-evaluation region setting step of setting a non-evaluation region which is not used for region extension processing in the region extension step,
wherein the region extension processing is not executed for the non-evaluation region.

8. The method according to claim 7, wherein the non-evaluation region set in the non-evaluation region setting step includes at least one of a catch light region and a region where an iris is hidden by an eyelid.

9. A non-transitory computer-readable medium storing a computer-executable program for causing a computer to execute an image processing method according to any one of claims 1 to 4 and 5 to 8.

10. An image processing apparatus comprising:
input means for inputting an image;
eye region detection means for detecting an eye region from the input image;
iris outline detection means for detecting an iris outline from the eye region;
iris color setting means for setting an iris color based on a color distribution of pixels having luminance values of a first predetermined ratio in a neighboring region inside the iris outline;
region extension means for extending a region from a reference pixel inside the iris outline so that colors of more than a second predetermined ratio of adjacent pixels in an extended region fall within a predetermined color range with respect to the set iris color, and setting the extended region as a poor hue quality region in the eye region;
poor hue quality region shaping means for shaping the poor hue quality region; and
poor hue quality region correction means for correcting a hue of the shaped poor hue quality region.

11. An image processing method comprising:
an input step of inputting an image;
an eye region detection step of detecting an eye region from the input image;
an iris outline detection step of detecting an iris outline from the eye region;
an iris color setting step of setting an iris color based on a color distribution of pixels having luminance values of a first predetermined ratio in a neighboring region inside the iris outline;
a region extension step of executing region extension from a reference pixel inside the iris outline so that colors of more than a second predetermined ratio of adjacent pixels in an extended region fall within a predetermined color range with respect to the set iris color, and setting the extended region as a poor hue quality region in the eye region, wherein the colors comprise R, G and B values;
a poor hue quality region shaping step of shaping the poor hue quality region;
a poor hue quality region correction step of correcting a hue of the shaped poor hue quality region; and
a non-correction region detection step of detecting a non-correction region from the eye region, wherein the non-correction region is an eyelid region,
wherein correction processing in the poor hue quality region correction step is executed for a region except the non-correction region detected in the non-correction region detection step.

12. The image processing method according to claim 11, wherein the second predetermined ratio is 80%.

* * * * *